US011165465B2

(12) United States Patent
Teboulle et al.

(10) Patent No.: US 11,165,465 B2
(45) Date of Patent: Nov. 2, 2021

(54) METHOD FOR TRANSPORTING LORA FRAMES ON A PLC NETWORK

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/447,331

(22) Filed: Jun. 20, 2019

(65) Prior Publication Data

US 2020/0007191 A1  Jan. 2, 2020

(30) Foreign Application Priority Data

Jun. 28, 2018  (FR) ...................................... 18/55822

(51) Int. Cl.
*H04B 3/54* (2006.01)
*H04B 3/36* (2006.01)
(Continued)

(52) U.S. Cl.
CPC ............. *H04B 3/542* (2013.01); *H04B 3/36* (2013.01); *H04L 12/2854* (2013.01); *H04L 12/4604* (2013.01)

(58) Field of Classification Search
CPC ... H04B 3/00; H04B 3/02; H04B 3/03; H04B 3/06; H04B 3/36; H04B 3/42; H04B 3/50;
(Continued)

(56) References Cited

U.S. PATENT DOCUMENTS

2008/0186201 A1* 8/2008 Wang ..................... G01D 4/004
340/870.03
2012/0056753 A1* 3/2012 Chen ....................... H04Q 9/00
340/870.02
(Continued)

FOREIGN PATENT DOCUMENTS

EP          3122061 A1    1/2017
WO     2018/046686 A1    3/2018

OTHER PUBLICATIONS

Mar. 20, 2019 Search Report issued in French Patent Application No. FR 1855822.

*Primary Examiner* — Young T. Tse
(74) *Attorney, Agent, or Firm* — Oliff PLC

(57) ABSTRACT

A method for transporting LoRa frames over a first network of a system for the automated management of meterings from a plurality of electricity meters, referred to as meters, said meters in the plurality being attached to at least one data concentrator via the first network, each data concentrator being connected to a server via a second network. The method is executed by a meter in the plurality and comprises: receiving a frame, each frame received corresponding to the same frame sent by an endpoint; relaying a received frame, referred to as the first frame, corresponding to said sent frame, in the direction of the server, the first frame being selected in accordance with a predetermined criterion; when a plurality of frames corresponding to said sent frame are received, rejecting at least a subset of frames in the plurality of frames different from the first frame.

10 Claims, 5 Drawing Sheets

(51) Int. Cl.
*H04L 12/28* (2006.01)
*H04L 12/46* (2006.01)

(58) Field of Classification Search
CPC .......... H04B 3/54; H04B 3/542; H04B 3/544; H04B 3/56; H04B 3/58; H04B 7/14; H04B 7/15542; H04B 7/15592; H04L 12/28; H04L 12/803; H04L 12/2807; H04L 12/2854; H04L 12/2856; H04L 12/40; H04L 12/40006; H04L 12/40032; H04L 12/40078; H04L 12/40182; H04L 12/4604
USPC ......... 375/211–213, 257, 259; 370/221, 222, 370/226, 241.1, 245, 257, 258, 315, 370/395.5, 395.52, 395.53
See application file for complete search history.

(56) References Cited

U.S. PATENT DOCUMENTS

| | | | | |
|---|---|---|---|---|
| 2014/0307658 A1* | 10/2014 | Vedantham | ........... | H04L 1/0002 370/329 |
| 2014/0321264 A1* | 10/2014 | Kariya | ................ | H04L 41/0659 370/218 |
| 2019/0346495 A1* | 11/2019 | Kim | ...................... | G01R 22/063 |
| 2020/0028540 A1* | 1/2020 | Teboulle | ........... | H04W 52/0229 |

\* cited by examiner

| | |
|---|---|
| Subpart 51 | Subpart 52 |
| UDP header 53 ||
| IPv6 header 54 ||
| 6LowPAN header 55 ||
| G3-PLC header 56 ||

Fig. 5

| | |
|---|---|
| Subpart 51 | Subpart 62 |
| HTTP header 63 ||
| TCP header 64 ||
| IP header 65 ||
| Ethernet header 66 ||

Fig. 6

| | |
|---|---|
| Subpart 51 | Subpart 72 |
| UDP header 53 ||
| IPv6 header 54 ||
| 6LowPAN header 55 ||
| G3-PLC header 56 ||

Fig. 7

| | |
|---|---|
| Subpart 51 | Subpart 82 |
| HTTP header 63 ||
| TCP header 64 ||
| IP header 65 ||
| Ethernet header 66 ||

Fig. 8

METHOD FOR TRANSPORTING LORA FRAMES ON A PLC NETWORK

BACKGROUND

The present invention relates to a method for transporting frames sent by terminals over a network of the LPWAN type by means of a powerline communication network of a system for the automatic management of electricity meter meterings, and a device and system implementing the method.

With the recent appearance of the Internet of Things (IOT) a new type of network has appeared: long-range wireless networks with low energy consumption ("Low Power Wide Area Networks (LPWAN)"). Among these LPWAN networks, mention can be made of networks based on the LoRa (registered trade mark) ("Long Range") technology and networks of the company Sigfox.

A network based on LoRa technology (hereinafter referred to as a "LoRa network") uses a protocol called LoRaWAN. A LoRa network is composed of base stations or gateways generally placed on high points in order to cover a large geographical area. The gateways (hereinafter referred to as LoRa gateways, are able to detect messages sent in their area by equipment or terminals ("endpoints") and to transfer them to at least one server ("LoRa network server (LNS)"), hereinafter referred to as an LNS server, which will process them.

In a conventional functioning of a LoRa network, an endpoint wishing to transmit a message (i.e. data) to the LNS server transmits this message in a frame, referred to as an uplink LoRa frame, in accordance with the LoRaWAN protocol. The uplink LoRa frame is transmitted in broadcast mode. This uplink LoRa frame is received by at least one LoRa gateway. Each LoRa gateway that has received the uplink LoRa frame decodes it and transmits the message to the server in an HTTP (HyperText Transfer Protocol) request. If a plurality of LoRa gateways have received the uplink LoRa frame, the server receives a plurality of HTTP requests containing the message. The server must then designate, from among the LoRa gateways that received the uplink LoRa frame, the LoRa gateway to be used for relaying a response to the message contained in the uplink LoRa frame. The response is transmitted from the server to the designated LoRa gateway in an HTTP request, and then in unicast mode, from the designated LoRa gateway to the endpoint in a downlink LoRa frame in accordance with the LoRaWAN protocol.

Although LPWAN networks are becoming more and more widespread, there exist areas outside the range of these networks. These areas then do not have access to the Internet of Things.

Other networks offer a much finer coverage of territories, in particular in developed countries. Electricity networks can in particular be thought of. Electricity networks, which basically were intended solely for transporting electricity, have developed lately in order to become networks in which data can circulate. Powerline communication networks for systems of the AMM (automated meter management) type thus use infrastructures of the electricity networks in order to create a so-called logic network. Among these logic networks, referred to as PLC (powerline communication) networks, mention can be made of networks in accordance with the PRIME (PoweRline Intelligent Metering Evolution) specifications or networks in accordance with the G3-PLC standard specified in ITU-T recommendation G.9903. In PLC networks, communications are established between electricity meters (referred to as smart electricity meters) and a device called a data concentrator in order in particular to allow remote automated metering of electricity consumption measurements made by said smart electricity meters. Hereinafter each smart electricity meter is simply referred to as a meter. A plurality of data concentrators are typically deployed geographically in a PLC network so as to distribute the remote-management load of a multitude of meters. Each data concentrator is itself connected to the same centralised unit affording management of the AMM system, which is managed by an operator of the electricity supply network to which said meters are connected.

As indicated by the acronym AMM, PLC networks for AMM systems are intended to transport metrology data coming from meters. No provision is made, neither in hardware terms nor in protocol terms, for transporting anything other than metrology data coming from meters. Electricity networks which, unlike LPWAN networks, finely cover territories, cannot therefore, at the present time, be used for transporting data coming from objects connected in areas not covered by the LPWAN networks.

It is desirable to overcome these drawbacks of the prior art. It is in particular desirable to propose a method for benefiting from the coverage of a PLC network for AMM systems for routing to a server data coming from connected objects outside the range of an LPWAN network. Since metrology data have priority on PLC networks for AMM systems, the method proposed must ensure that the transport of data coming from connected objects does not affect the transport of metrology data.

It is also desirable to provide a solution that is simple to implement at low cost.

BRIEF SUMMARY

According to a first aspect of the present invention, the present invention relates to a method for transporting frames sent by endpoints over an LPWAN network by means of a first so called AMM powerline communication network of a system for the automated management of meterings from a plurality of electricity meters, referred to as meters, said meters in the plurality of meters being attached to at least one data concentrator via the AMM network, each data concentrator being connected to a server via a second network and serving as a relay between said meters and the server. Said method is executed by a meter in the plurality of meters and comprises: receiving a frame in accordance with a communication protocol suited to LPWAN networks, each frame received corresponding to the same frame sent over the LPWAN network by an endpoint; relaying a received frame, referred to as the first frame, corresponding to said sent frame, in the direction of the server, the first frame being selected in accordance with a first predetermined criterion; when a plurality of frames corresponding to said sent frame are received, rejecting at least a subset of frames in the plurality of frames different from the first frame, each frame in the subset being selected in accordance with a second predetermined criterion.

The method of the invention therefore enables frames sent over an LPWAN network to pass over a powerline communication network of a system for the automated management of meterings from a plurality of electricity meters. Moreover, the method of the invention limits the number of frames actually routed to the server, which makes it possible to limit the bandwidth used by the frames in accordance with the communication protocol suited to LPWAN networks over said powerline communication network.

According to one embodiment, the first predetermined criterion consists of selecting the frame corresponding to said sent frame received first or selecting the first frame randomly from among the frames corresponding to said sent frame that were received during a predetermined period or selecting the first frame offering a best reception quality from among the frames corresponding to said sent frame that were received during a predetermined period.

According to one embodiment, the second predetermined criterion consists of rejecting each frame in the plurality that is different from the first frame or randomly selecting a predefined quantity of frames from among the frames in the plurality that are different from the first frame, all the other frames in the plurality being rejected, or selecting a predefined quantity of frames offering a best transmission quality from among the frames in the plurality that are different from the first frame, all the other frames in the plurality being rejected.

According to one embodiment, said meter transmits an acknowledgement frame in the direction of the endpoint in order to acknowledge said sent frame when it has been designated by the server for acknowledging each frame sent by said endpoint.

According to a second aspect of the invention, the invention relates to a device of the electricity meter type included in a first so called AMM powerline communication network of a system for the automated management of meterings from a plurality of electricity meters, said meters in the plurality of meters being attached to at least one data concentrator via the AMM network, each data concentrator being connected to a server via a second network and serving as a relay between said meters and the server. Said device comprises relay means for relaying, in the direction of the server, a frame, referred to as the first frame, received by the device, corresponding to a frame in accordance with a communication protocol suited to LPWAN networks sent by an endpoint over an LPWAN network, the first frame being selected in accordance with a first predetermined criterion; and rejection means, used when a plurality of frames corresponding to said sent frame are received, for rejecting at least a subset of frames in the plurality that are different from the first frame, each frame in the subset being selected in accordance with a second predetermined criterion.

According to one embodiment, the device comprises a communication interface with an LPWAN network enabling said meter to receive frames in accordance with a communication protocol suited to LPWAN networks.

According to a third aspect of the invention, the invention relates to a system, referred to as an AMM system, for automated management of meterings from electricity meters, referred to as meters, said system comprising a plurality of meters, at least one data concentrator and a server, the meters in the plurality of meters being attached to a data concentrator via a first powerline communication network, each data concentrator being connected to the server via a second network and serving as a relay between said meters and the server. At least one meter in said AMM system is a device according to the first aspect, referred to as an LPWAN meter.

According to one embodiment, when the AMM system comprises a plurality of LPWAN meters, the server comprises means for determining, for each endpoint communicating with one of said LPWAN meters, which LPWAN meter communicating with said endpoint must acknowledge each frame sent by said endpoint.

According to a fourth aspect of the invention, the invention relates to a computer program comprising instructions for the implementation, by a device, of the method according to the first aspect when said program is executed by a processor of said device.

According to a fifth aspect of the invention, the invention relates to storage means storing a computer program comprising instructions for the implementation, by a device, of the method according to the first aspect when said program is executed by a processor of said device.

BRIEF DESCRIPTION OF THE SEVERAL VIEWS OF THE DRAWINGS

The features of the invention mentioned above, as well as others, will emerge more clearly from a reading of the following description of an example embodiment, said description being given in relation to the accompanying drawings, among which:

FIG. 5 illustrates schematically an encapsulation of an uplink LoRa frame in a G3-PLC frame;

FIG. 6 illustrates schematically an encapsulation of an uplink LoRa frame in an HTTP frame;

FIG. 7 illustrates schematically an encapsulation of a downlink LoRa frame in a G3-PLC frame;

FIG. 8 illustrates schematically an encapsulation of a downlink LoRa frame in an HTTP frame.

DETAILED DESCRIPTION

The invention is described in a context of a PLC network in an AMM system in which the communications are based on the G3-PLC protocol. Moreover, as we shall see hereinafter, some meters in the PLC network comprise a communication interface for communicating over an LPWAN network of the LoRa type using frames in accordance with the LoRaWAN protocol. The invention could just as well be used in another context. The PLC network of the AMM system could just as well use communications based on the PRIME specifications. Moreover, the LPWAN network could be a SigFox network.

Figure 1:
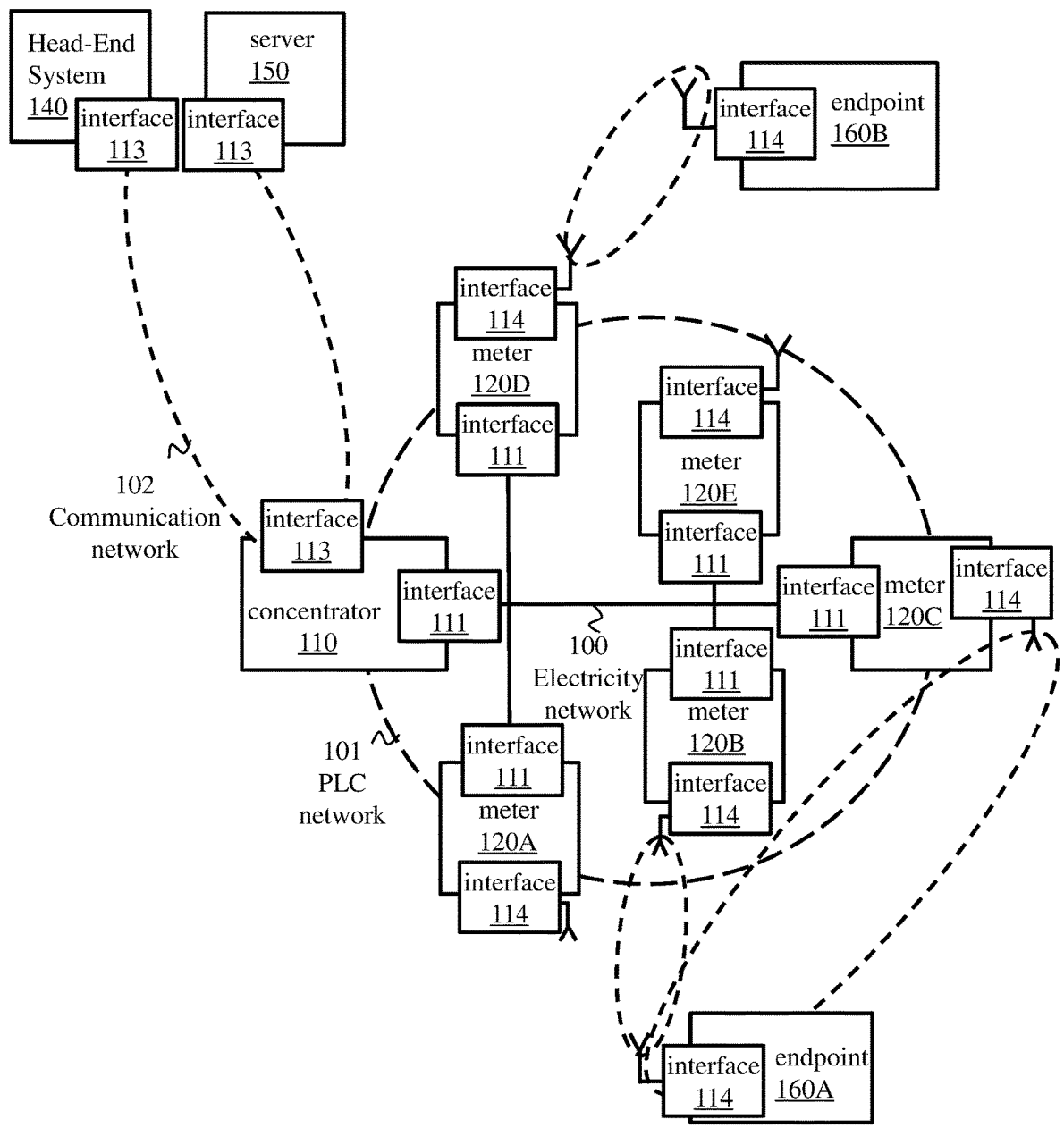
FIG. 1 illustrates schematically an example of an AMM system in which the invention is implemented.

FIG. 1 illustrates schematically an example of an AMM system in which the invention is implemented.

The AMM system in FIG. 1 comprises a termination system, referred to as an HES (head end system) 140. The HES system 140 receives electricity consumption metering information collected by a plurality of meters 120A, 120B, 120C, 120D and 120E (denoted 120A-E) and processes them. To enable said meters to transmit said information to the HES system 140, PLC communications are established between each of said meters and a data concentrator 110. The communication system typically comprises a plurality of data concentrators 110, only one being shown in FIG. 1. A plurality of meters are connected, logically, to each data concentrator 110, each data concentrator 110 thus serving as a relay between said meters that are connected thereto and the HES system 140.

A PLC network 101 is thus formed between each data concentrator 110 and the plurality of meters connected thereto. This PLC network 101 is based on an electricity distribution network 100 (i.e. a physical network) serving to supply electricity to the electrical installations that said meters 120 are responsible for monitoring. Each meter 120A-E thus comprises a PLC communication interface 111 for communicating via the PLC network 101. Likewise, each data concentrator 110 comprises such a PLC communication interface 111 for communicating via the PLC network 101. According to an example embodiment, the PLC network 101 is in accordance with the G3-PLC protocol.

To make it possible to relay the information transmitted by the meters 120A-E to the HES system 140, each data concentrator 110 further comprises an interface 113 for communication with a communication network 102, to which the HES system 140 is also connected.

The HES system 140 thus comprises an interface 113 for communicating via the communication network 102 enabling it to communicate with a plurality of data concentrators 110. The communication network 102 is preferentially a network of the IP (Internet Protocol) type as defined in the normative document RFC 791, such as the internet. In one embodiment, the communications between the data concentrator 110 and the HES system 140 use HTTP requests.

In FIG. 1, each meter 120A-E comprises an interface 114 for communicating with an LPWAN network of the LoRa type, referred to as a LoRa network. The LoRa network enables each meter 120A-E to communicate with endpoints situated within range of said meters, each endpoint being connected to the LoRa network by means of the same communication interface 114. In FIG. 1, two endpoints of the connected object type 160A and 160B are depicted. The meters 120A-E and the endpoints 160A and 160B communicate according to the LoRaWAN protocol. In FIG. 1, each uplink LoRa frame sent in broadcast mode by the endpoint 160A is received by the meters 120B and 120C. Each uplink LoRa frame sent in broadcast mode by the endpoint 160B is received by the meter 120D.

Each uplink LoRa frame sent by an endpoint is intended for a server 150, referred to as a LoRa network server (LNS). The LNS server 150 receives the uplink LoRa frames collected by the data concentrator 110 and processes them.

To enable the LNS server 150 to receive the uplink LoRa frames collected by the data concentrator 110, the LNS server 150 comprises an interface 113 for communicating with the communication network 102. In one embodiment, the communications between the data concentrator 110 and the LNS server 150 use HTTP requests.

In the system in FIG. 1, each meter having a communication interface 114 implements a LoRa gateway and therefore fulfils a role similar to a LoRa gateway in a conventional LoRa network vis-à-vis the endpoints. However, as we shall see hereinafter in relation to FIGS. 2 and 4, in order to avoid overloading the AMM system by LoRa requests, not all the uplink LoRa requests received by a meter 120A-E are transferred to the LNS server 150.

Each entity in the system in FIG. 1, whether a data concentrator 110, a meter 120A-E, the HES system 140 or the LNS server 150, comprises a processing module 30 (not shown) enabling these entities to participate in an implementation of the invention.

Figure 2:
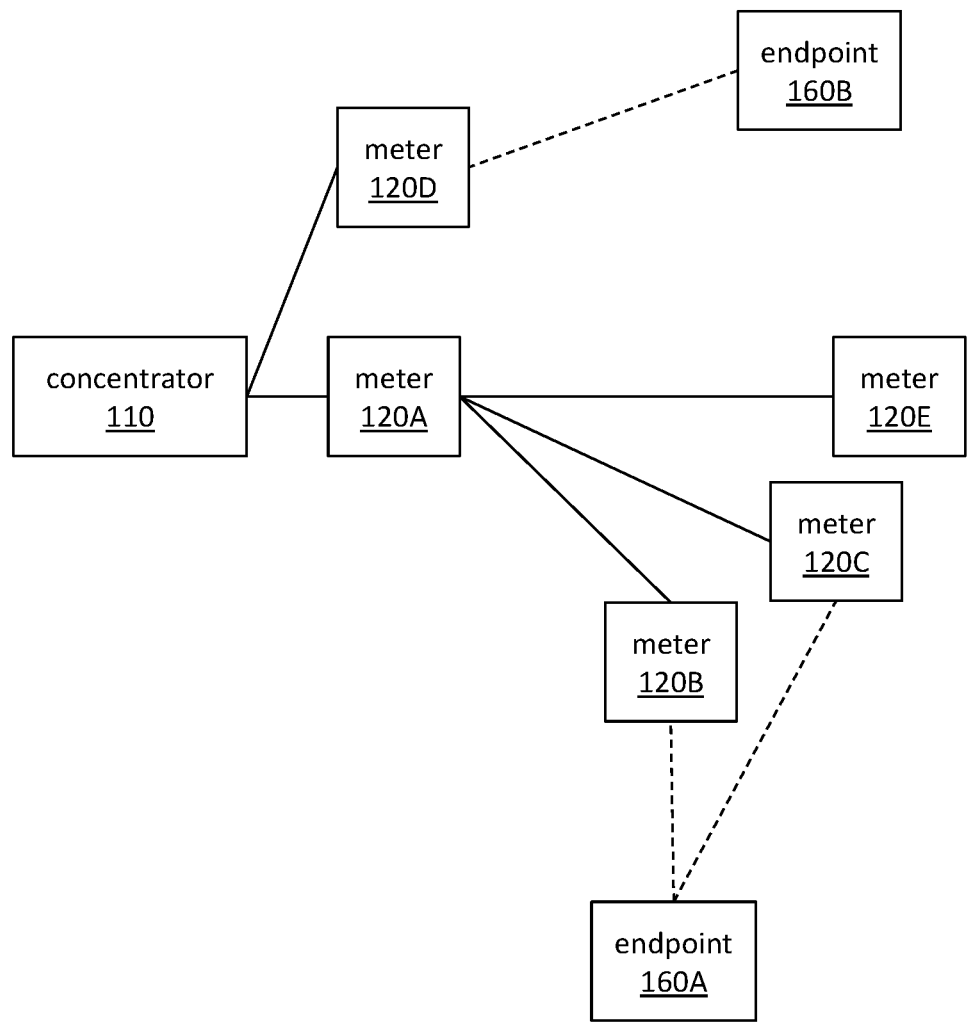
FIG. 2 illustrates schematically a representation of a logic network corresponding to a physical network illustrated in FIG. 1.

FIG. 2 illustrates schematically a representation of a logic network corresponding to the PLC network implemented on the electrical network 100 illustrated in FIG. 1.

As mentioned in relation to FIG. 1, each meter 120A-E is connected to a data concentrator 110. On the other hand, from a logic point of view, certain meters, such as the meters 120A and 120D, are connected directly to the data concentrator 110, whereas other meters, such as the meters 120B, 120C and 120E, are connected indirectly to the data concentrator 110 by means of another meter. Thus the meters 120A and 120D can communicate directly with the data concentrator 110. On the other hand, each frame in accordance with the G3-PLC standard, referred to as a G3-PLC frame hereinafter, sent by the meters 120B, 120C and 120E must pass through the meter 120A in order to reach the data concentrator 110. A parent-child hierarchy is therefore created between some meters. For example, the meter 120A is a parent vis-à-vis the meters 120B, 120C and 120E, which are themselves children of the meter 120A.

As we have seen in relation to FIG. 1, each uplink LoRa frame sent by the endpoint 160A is received by the meters 120B and 120C. Consequently, when an uplink LoRa frame is sent by the endpoint 160A, it is received by the meter 120B, which relays it to the meter 120A, and by the meter 120C, which relays it also to the meter 120A. The same uplink LoRa frame is therefore received twice by the meter 120A. In a conventional LoRa network, each LoRa gateway receiving an uplink LoRa frame relays it to an LNS server to which it is connected. A LoRa gateway cannot be concerned with knowing whether one or more other LoRa gateways have relayed the same uplink LoRa frame. In a conventional LoRa network, a LoRa gateway receiving an uplink LoRa frame has no means of knowing whether this uplink LoRa frame has been received and relayed to the LNS server by another LoRa gateway.

As can be seen in FIG. 2, the situation is different when the LoRa gateway is integrated in a meter such as the meters 120A-E. This is because some meters, such as the meter 120A, because of the organisation in a parent-child hierarchy of the meters in the AMM system, receive the same frame several times. By analysing the uplink LoRa frames that it receives, a meter can know that it is receiving the same uplink LoRa frame several times.

Figure 3:
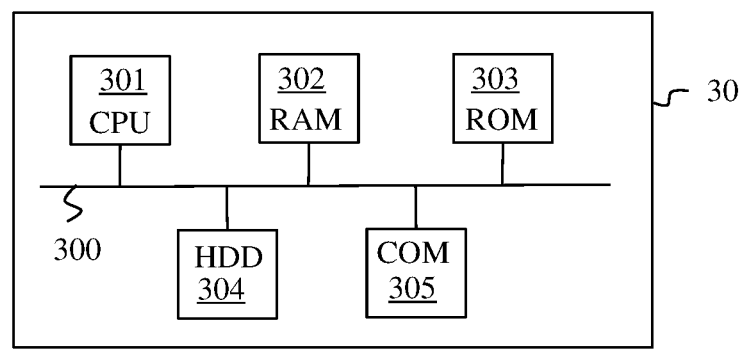
FIG. 3 illustrates schematically an example of hardware architecture of a processing module.

FIG. 3 illustrates schematically an example of hardware architecture of the processing module 30.

The processing module 30 then comprises, connected by a communication bus 300: a processor or CPU 301; a random access memory RAM 302, a read only memory ROM 303, a storage unit or a storage medium reader, such as an SD card reader 304; a set of communication interfaces 305 enabling the processing module 30 to communicate with other entities in the system in FIG. 1.

When the processing module 30 is included in a meter 120A-E, the set of communication interfaces 305 comprises the interface 111 for communicating to the PLC network 101 and the interface 114 for communicating to an LPWAN network.

When the processing module 30 is included in a data concentrator 110, the set of communication interfaces 305 comprises the interface 111 for communicating to the PLC network 101 and the interface 113 for communicating to the communication network 102.

When the processing module 30 is included in the HES system 140, the set of communication interfaces 305 comprises the interface 113 for communicating to the network 102.

When the processing module 30 is included in the LNS server 150, the set of communication interfaces 305 comprises the interface 113 for communicating to the network 102.

When the processing module 30 is included in an endpoint 160A or 160B, the set of communication interfaces 305 comprises the interface 114 for communicating to the LPWAN network.

The processor 301 is capable of executing instructions loaded into the RAM 302 from the ROM 303, from an external memory (not shown), from a storage medium, such as an SD card, or from a communication network. When the entity (i.e. the data concentrator 110, a meter 120A-E, the HES system 140, the LNS server 150 or an endpoint 160A or 160B) is powered up, the processor 301 is capable of reading instructions from the RAM 302 and executing them. These instructions form a computer program causing the implementation, by the processor 301, of a method described in relation to FIG. 4.

Figure 4:
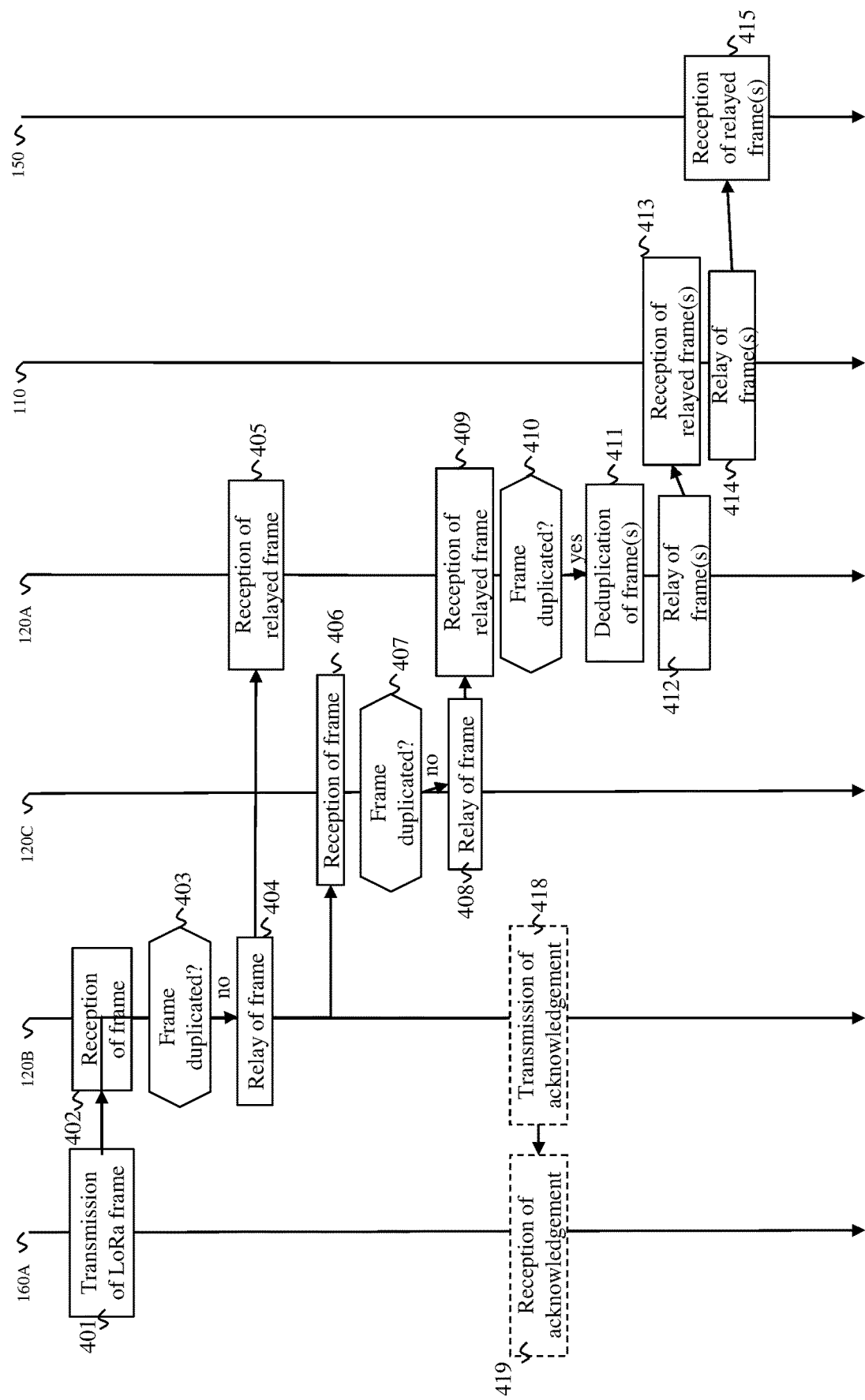
FIG. 4 illustrates schematically an example of implementation, in an AMM system, of a method for routing frames sent by endpoints over an LPWAN network.

All or part of the method described in relation to FIG. 4 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 4 illustrates schematically an example implementation, in an AMM system, of a method for routing frames sent by endpoints over an LPWAN network.

In FIG. 4 we take the example of an uplink LoRa frame sent by the endpoint 160A. A similar implementation would have been obtained for an uplink LoRa frame sent by the endpoint 160B.

In a step 401, the processing module 30 of the endpoint 160A causes the sending of an uplink LoRa frame. This uplink LoRa frame is transmitted in broadcast mode by means of the communication interface 114 of the endpoint 160A. The uplink LoRa frame comprises an identifier of the endpoint 160A in the form of an address DevAddr.

In a step 402, the processing module 30 of the meter 120B detects a reception, by the meter 120B on its communication interface 114, of the uplink LoRa frame.

Although these two frames are identical, hereinafter we call the uplink LoRa frame when it is sent by the endpoint 160 the sent frame and the uplink LoRa frame when it is received by a meter, for example here the meter 120B, the received frame.

In a step 403, in order to decide whether the frame received by the meter 120B must be relayed, the processing module 30 of the meter 120B determines whether this frame complies with a first predetermined criterion.

In one embodiment, referred to as non-time-delayed mode, the predetermined criterion consists of systematically selecting the frame corresponding to said sent frame received first by the meter 120B.

In one embodiment, referred to as first time-delayed mode, during step 403, the processing module waits for a predetermined period TEMPO following the first reception of a frame corresponding to the same sent frame. The predetermined period TEMPO is for example 200 ms. In this embodiment, the predetermined criterion consists of randomly selecting a frame among the frames corresponding to said sent frame that were received by the meter 120B during the predetermined period TEMPO.

In one embodiment, referred to as the second time-delayed mode, during step 403, the processing module 30 waits for the predetermined period TEMPO following the first reception of a frame corresponding to the same sent frame. In this embodiment, the predetermined criterion consists of selecting the frame offering the best reception quality from among the frames corresponding to said sent frame that were received during the predetermined period TEMPO.

In the case of FIG. 4, the meter 120B receives the frame sent by the endpoint 160A only once. Consequently, whatever the embodiment, the only frame received is selected to be relayed.

In a step 404, the processing module 30 of the meter 120B encapsulates the received frame in a G3-PLC frame and transmits this G3-PLC frame in the direction of the data concentrator 110. The meter 120B therefore transmits the G3-PLC frame to the meter 120A. The G-PLC frame sent by the meter 120B is hereinafter referred to as the first G3-PLC frame.

FIG. 5 illustrates schematically an encapsulation of an uplink LoRa frame in a G3-PLC frame.

The frame depicted in FIG. 5 is therefore a frame in accordance with the G3-PLC standard. This G3-PLC frame comprises, in a field 56, a G3-PLC header, in a field 55 a 6LowPAN (IPv6 Low Power Wireless Personal Area Network) header, in a field 54 an IPv6 (Internet Protocol version 6) header and, in a field 53, a UDP (User Datagram Protocol) header. The G3-PLC frame further comprises a first subpart 51 comprising the encapsulated uplink LoRa frame and a second subpart 52. The subparts 51 and 52 form a payload of the G3-PLC frame. The second subpart 52 is intended to receive identifiers of each meter that has received the encapsulated LoRa frame directly (i.e. through a network interface 114). In one embodiment, each LoRa gateway implemented by a meter has an IP (Internet Protocol) address. The identifier of a meter that has received the uplink LoRa frame is in this case the IP address of the LoRa gateway implemented by this meter. In another embodiment, a LoRaWAN transport service by G3-PLC implemented by the meter is associated with a UDP port number. In this embodiment, the identifier of a meter that has directly received the uplink LoRa frame is an IP address of the meter and the UDP port number the one associated with the LoRaWAN transport service by G3-PLC. However, since the source IP address conveyed by the IPv6 transport protocol in the field 54 is always that of the meter, there is no longer any need to transmit the IP address in the field 52.

In these embodiments, during step 404, the meter 120B stores the identifier of the meter 120B in the subpart 52.

In one embodiment, in addition to storing an identifier of each meter that has received the uplink LoRa frame, the subpart 52 stores, for each meter that has received the uplink LoRa frame, information representing a quality of reception of said uplink LoRa frame by said meter. The quality information is for example a signal to noise ratio (SNR) and/or an indication about the strength of the received signal (received signal strength indication (RSSI)).

In this embodiment, the subpart 52 comprises information representing the quality of reception of the frame sent by the endpoint 160A by the meter 120B.

In a step 406, the processing module 30 of the meter 120C detects a reception, by the meter 120C on its communication interface 114, of the frame sent by the endpoint 160A.

In a step 407, the processing module 30 of the meter 120C applies a step identical to step 403. The result of step 407 is then identical to the result of step 403, since the processing module 30 of the meter 120C selects the only frame received and relays this frame during step 408 in the direction of the data concentrator 110 in a G3-PLC frame. The G3-PLC frame sent by the meter 120C is hereinafter referred to as the second G3-PLC frame.

The second G3-PLC frame repeats the frame format described in relation to FIG. 5. In the subpart 51, it comprises the same uplink LoRa frame as the first G3-PLC frame. In the subpart 52, it comprises the identifier of the meter 120C. In one embodiment, the subpart 52 also comprises information representing a quality of reception of said uplink LoRa frame by the meter 120C.

In steps 405 and 409, the processing module 30 of the meter 120A receives respectively the first G3-PLC frame and the second G3-PLC frame on its communication interface 111.

In a step 410, the processing module 30 of the meter 120A applies a step identical to steps 403 and 407. However, whereas steps 403 and 407 were executed in a context where the meters 120B and 120C each received only one frame corresponding to the frame sent, during step 410 the meter 120A receives two frames corresponding to the frame sent.

In the case of non-time-delayed mode, the processing module 30 of the meter 120A selects the first received frame corresponding to the frame sent as soon as this frame is received. The frame received during step 405 is therefore selected to be relayed.

In the case of the first time-delayed mode, the processing module 30 of the meter 120A randomly selects one frame among the frames corresponding to the frame sent that it has received. For example, the processing module 30 of the meter 120A selects the frame received during step 405 (i.e. the first G3-PLC frame).

In the case of the second time delayed mode, the processing module 30 of the meter 120A selects the frame offering the best quality of reception among the frames corresponding to the frame sent that it received. To do this, the processing module 30 of the meter 120A uses the information representing a quality of reception contained in the subpart 52 of each G3-PLC frame received (i.e. the first and second G3-PLC frames). For example, the processing module 30 of the meter 120A selects the frame received during step 409 (i.e. the second G3-PLC frame).

When a plurality of frames corresponding to the sent frame are received, during a step 411 the processing module rejects at least a subset of the frames in the plurality that are different from the frame selected during step 410, each frame in the subset being selected in accordance with a second predetermined criterion.

In one embodiment, the second predetermined criterion consists of rejecting each frame in the plurality that is different from the frame selected during step 410. Thus, in this embodiment, each meter 120A-E relays only one frame corresponding to the frame sent to the data concentrator 110.

In one embodiment, the second predetermined criterion consists of randomly selecting a predefined quantity of frames among the frames in the plurality different from the frame selected during step 410, all the other frames in the plurality being rejected. For example, the processing module 30 of the meter 120A randomly selects one frame among the frames in the plurality that is different from the frame selected during step 410. Thus, in this embodiment, each meter 120A-E relays two frames corresponding to the frame sent to the data concentrator 110.

In one embodiment, the second predetermined criterion consists of selecting a predefined quantity of frames offering a best quality of transmission among the frames in the plurality different from the frame selected during step 410, all the other frames in the plurality being rejected. To do this, the processing module 30 of the meter 120A uses the information representing a quality of reception contained in the subpart 52 of each G3-PLC frame received. For example, the processing module 30 of the meter 120A selects one frame among the frames in the plurality that is different from the frame selected during step 410. Thus, in this embodiment, each meter 120A-E relays two frames corresponding to the sent frame to the data concentrator 110. For example, each meter relays the frames offering the best two transmission qualities among the frames in the plurality.

In a step 412, the processing module 30 of the meter 120A causes the relaying of each frame selected (i.e. each G3-PLC frame encapsulating an uplink LoRa frame corresponding to the frame sent by the endpoint 160A) to the data concentrator 110. Each frame relayed complies with the frame format described in relation to FIG. 5. During step 412, each frame relayed comprises the uplink LoRa frame sent by the endpoint 160A during step 401 in its subpart 51. Moreover, during step 412, each frame relayed comprises, in its subpart 52, the identifier of each meter that directly received the uplink LoRa frame (here this corresponds to the meters 120B and 120C). In one embodiment, the subpart 52 also comprises, for each meter that directly received the uplink LoRa frame sent by the endpoint 160A, information representing a quality of reception of said frame by the meter. In the example in FIG. 4, each relayed G3-PLC frame comprises information representing the quality of reception of the uplink LoRa frame by the meter 120B and information representing the quality of reception of the uplink LoRa frame by the meter 120C.

In a step 413, the processing module 30 of the data concentrator 110 detects that the data concentrator 110 has received at least one G3-PLC frame. During step 413, the processing module 30 determines, for each G3-PLC frame received, whether the G3-PLC frame contains metrology data emanating from a meter or whether it contains data in accordance with the LoRaWAN protocol. To do this, the processing module 30 of the data concentrator 110 determines whether the payload of the G3-PLC frame contains subparts 51 and 52. When the G3-PLC frame comprises metrology data, the payload of the G3-PLC frame is extracted and encapsulated in an HTTP frame, which is transmitted in the direction of the HES system 140. When the G3-PLC frame comprises subparts 51 and 52, the payload of the G3-PLC frame is extracted and encapsulated in an HTTP frame, which is transmitted in the direction of the LNS server 150 in a step 414.

FIG. 6 illustrates schematically an encapsulation of an uplink LoRa frame in an HTTP frame.

The HTTP frame comprises in a field 66 for example an Ethernet header, in a field 65 an IP header (IPv4 or IPv6), in a field 64 a TCP (transmission control protocol) header and in a field 63 and HTTP header. In a payload of the HTTP frame there are found the subpart 51 and a subpart 62, which is identical to the subpart 52 in the case where a UDP port number is not associated with the LoRaWAN transport service by G3-PLC (the subpart 62 therefore comprises the IP address of the LoRa gateway implemented by the meter that relayed the uplink LoRa frame), and which comprises the IP address of the meter implementing the LoRa gateway in the case where a UDP port number is associated with the LoRaWAN transport service by G3-PLC implemented by the meter that relayed the uplink LoRa frame. In a variant, it is possible to use the TLS (Transport Layer Security) with HTTP protocol, which corresponds to HTTPS (Hyper Text Transfer Protocol Secure), so as to transmit in a secure manner.

During a step 415, the processing module 30 of the LNS server 150 detects that the LNS server 150 has received an HTTP frame containing data in accordance with the LoRaWAN protocol and processes these data.

In a conventional LoRa network, the message exchanges between an endpoint and an LNS server are bidirectional. An LNS server can for example acknowledge an uplink LoRa frame. To do this, as seen above, if a plurality of LoRa gateways have received the same uplink LoRa frame, the LNS server must designate, among the LoRa gateways that have received the uplink LoRa frame, the LoRa gateway to be used for relaying a response to the message contained in the uplink LoRa frame. The response is transmitted from the LNS server to the LoRa gateway designated in an HTTP request, and then in unicast, from the designated LoRa gateway to the endpoint in a downlink LoRa frame in accordance with the LoRaWAN protocol.

Applying such a procedure in the context of an AMM system used for relaying LoRa frames cannot be envisaged. This is because AMM systems have data transfer times that are incompatible with time constraints allocated by the LoRaWAN protocol to an endpoint for receiving an acknowledgement after sending of an uplink LoRa frame by said endpoint.

In one embodiment, the processing module 30 of the LNS server 110 designates, for each endpoint of which it has knowledge, one meter among the meters able to relay uplink LoRa frames for said endpoint. This designation may be done for example during a procedure of connection of an endpoint to a LoRa network.

We assume here that the uplink LoRa frame sent during step 401 by the endpoint 160A is a join request frame. In this case, the method described in relation to FIG. 4 is a start of a connection procedure corresponding to a join request phase.

During step 415, the LNS server 150 therefore receives, in the subpart 51 of at least one HTTP frame, a join request frame. Moreover, in the subpart 52, the LNS server 150 receives an identifier of the meters 120B and 120C. In one embodiment, the processing module 30 of the LNS server 150 randomly chooses one meter among the meters having an identifier in the subpart 52. In another embodiment, when the subpart 52 also comprises information representing reception qualities of the uplink LoRa frame included in the subpart 51, the processing module 30 of the LNS server 150 chooses the meter associated with the best information representing quality. For example, the processing module 30 of the LNS server 150 chooses the meter 120B. The designated meter is then used for each transmission of a downlink LoRa frame by the LNS server 150 to the endpoint 160A. The designation of the meter 120B may be definitive or updated periodically, for example every 24 hours. In the case of periodic updating, the processing module 30 of the LNS server 150 relies on the content of the subpart 52 associated with any uplink LoRa frame that it receives, without this uplink LoRa frame necessarily being a join request frame.

Following reception of the join request frame, the LNS server responds with a join accept frame.

Figure 9:
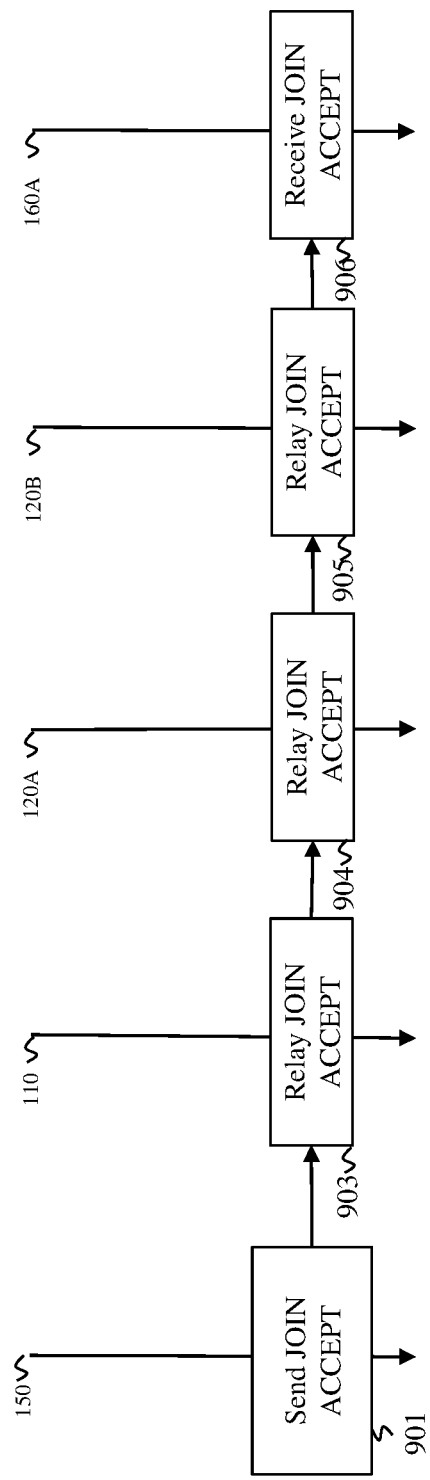
FIG. 9 illustrates schematically a connection authorisation procedure suited to the invention.

FIG. 9 illustrates schematically a join accept procedure.

In a step 901, the processing module of the LNS server 150 generates a downlink LoRa frame containing a join acceptance, referred to as a join accept frame, intended for the device 160A, encapsulates the join accept frame in an HTTP frame and causes transmission by the LNS server 150 of the HTTP frame to the data concentrator 110.

FIG. 8 illustrates schematically an encapsulation of a downlink LoRa frame in an HTTP frame.

The fields 63, 64, 65 and 66 are found in the HTTP frame. The subpart 51 comprises the join accept frame. The HTTP frame also comprises a subpart 82. The subpart 82 comprises the identifier of the designated meter. In the example in FIG. 9, it is the meter 120B. Moreover, the subpart 82 comprises a required time for sending of the downlink LoRa frame by the designated meter (i.e. the meter 120B). This sending time is a relative time with respect to a time of reception of an uplink LoRa frame by the designated meter.

In a step 903, the data concentrator 110 receives the HTTP frame. During step 903, the processing module 30 of the data concentrator 110 extracts the payload of the HTTP frame (i.e. the subparts 51 and 82) and forms a G3-PLC frame using this payload.

FIG. 7 illustrates schematically an encapsulation of a downlink LoRa frame in a G3-PLC frame.

The fields 53, 54, 55 and 56 are found in the G3-PLC frame. The subpart 51 comprises the downlink LoRa frame. A subpart 72 comprises the required time for sending of the downlink LoRa frame by the designated meter indicated in the subpart 82.

During step 903, the processing module 30 of the data concentrator 110 reads the address of the designated meter in the subpart 82 (or 72) and determines that, in order to reach the designated meter (i.e. the meter 120B), it must transmit the G3-PLC frame that it has formed to the meter 120A. The processing module 30 of the data concentrator 110 next causes the sending of the G3-PLC frame to the meter 120A.

In a step 904, the meter 120A receives the G3-PLC frame. During step 904, the meter 120A relays this frame in the direction of the meter 120B.

In a step 905, the processing module 30 of the meter 120B detects that the meter 120B has received the G3-PLC frame and extracts the downlink LoRa frame from the G3-PLC frame. The processing module 30 of the meter 120B awaits reception of an uplink LoRa frame from the endpoint 160A. When the processing module 30 of the meter 120B detects reception of an uplink LoRa frame, it notes the time of reception of this uplink LoRa frame, adds the value of the required sending time contained in the G3-PLC frame received during step 905 to the reception time in order to obtain an actual transmission time, and transmits the downlink LoRa frame to the endpoint 160A at the actual transmission time thus calculated. The downlink LoRa frame also contains an acknowledgement of the last uplink LoRa frame received. During step 905, the processing module 30 of the meter 120B determines that its identifier has been inserted in the subpart 72 and deduces from this that it has been designated to transmit each message coming from the LNS server 150 and intended for the endpoint 160A. Moreover, the processing module 30 of the meter 120A determines that it must as from now acknowledge each LoRa frame sent by the endpoint 160A.

In a step 906, the device 160A receives the downlink LoRa frame.

In the example in FIG. 9, the downlink LoRa frame is therefore a join acceptance. A similar method is applied for any other frame transmitted by the LNS server 150 to the endpoint 160A.

Returning to FIG. 4, it is assumed this time that the uplink LoRa frame sent by the endpoint 160A is a frame containing a message intended for the LNS server 150. A connection procedure with the sending of a join request frame by the endpoint 160A and transmission of a join acceptance by the LNS server 150 was executed previously. As seen above, the LNS server 150 does not acknowledge the uplink LoRa frames but delegates the responsibility for proceeding with the acknowledgements to a meter that it has designated. The connection procedure executed previously and described in relation to FIGS. 4 and 9 made it possible to designate the meter 120B for proceeding with the acknowledgement of the uplink LoRa frames coming from the endpoint 160A.

In a conventional LoRa network, an endpoint and the LNS server each manage a variable FcntUP and a variable FcntDOWN. To differentiate them, the variables FcntUP and FcntDOWN of the endpoint are hereinafter respectively referred to as FcntUP_T and FcntDown_T. All these variables are either in 32 bits (32 bit mode: the usual case) or in 16 bits (16 bit mode: variant). On the other hand, only the least significant 16 bits are transported in the LoRaWAN frames whatever the mode. The variables FcntUP and FcntDOWN of the LNS server are hereinafter respectively referred to as FcntUP_S and FcntDown_S. The LNS server manages a pair of variables FcntUP_S and FcntDown_S for each endpoint of which it has knowledge. The variable FcntUP_T is incremented by one unit whenever the endpoint transmits an uplink LoRa frame. The variable FcntDown_T is updated whenever the endpoint receives a downlink LoRa frame. In the case of the 32 bit mode, the endpoint takes into account the value in 16 bits received in the frame and manages an incrementation of the variable FcntDown_T according to this 16-bit value received, in particular concerning the $17^{th}$ bit starting from the right of the 32 bit variable. In the case of the 16-bit mode, the endpoint copies the 16 bit value received in the frame in its local variable. The variable FcntUP_S is managed exactly in the same way by the LNS server as the variable FcntDown_T of the endpoint, whenever the LNS server receives an uplink LoRa frame from the endpoint with which the variable is associated. The variable FcntDown_S is incremented by one unit whenever the LNS server transmits a downlink LoRa frame to the endpoint with which the variable is associated. During the procedure of connection to the LoRa network, the variables FcntUP_T, FcntDown_T, FcntUP_S and FcntDown_S are set to zero. When an endpoint transmits an uplink LoRa frame, it inserts the value of its FcntUP_T meter in this frame. When an LNS server transmits a downlink LoRa frame, it inserts the value of its FcntDown_S meter in this frame. When the LNS server receives from an endpoint an uplink LoRa frame containing a variable FcntUP_T the value of which is lower than the value of the variable FcntUP_S associated with said endpoint, it rejects the uplink LoRa frame. When an endpoint receives from the LNS server a downlink LoRa frame containing a variable FcntDown_S the value of which is less than the value of the variable FcntDown_T, it rejects the downlink LoRa frame.

In the context of the invention, a meter designated by the LNS server 150 for transmitting the downlink LoRa frames to an endpoint and for acknowledging the uplink LoRa frames coming from this endpoint, is also delegated the management of the variables FcntUP_S and FcntDown_S for the endpoint instead of the LNS server 150. In the example in FIG. 4, the processing module 30 of the meter 120B must manage the variables FcntUP_S and FcntDown_S associated with the endpoint 160A. Whenever the meter 120B relays a downlink LoRa frame intended for the endpoint 160A or transmits an acknowledgement frame to the endpoint 160A, the processing module 30 increments by one unit the value of the variable FcntDown_S and inserts this value in the downlink LoRa frame or in the acknowledgement frame. Whenever the meter 120B receives an uplink LoRa frame from the endpoint 160A, it updates the variable FcntUP_S as indicated above in the case of a conventional LoRa network. In the same way as a conventional LNS server, when the meter 120B receives from the endpoint 160A an uplink LoRa frame transporting a value of the variable FcntUP_T lower than the value of the variable FcntUP_S, the processing module 30 of the meter 120B rejects said frame.

Following reception of the uplink LoRa frame sent by the endpoint 160A by the meter 120B during step 402, the processing module 30 of the meter 120B executes a step 418. During step 418, the processing module 30 of the meter 120B generates an acknowledgement frame, increments by one unit the value of the variables FcntUP_S and FcntDown_S and inserts the value of the variable FcntDown_S in the acknowledgement frame. The acknowledgement frame is next transmitted to the endpoint 160A. It is assumed that each meter responsible for acknowledging uplink LoRa frames instead of the LNS server 150 has previously stored information of the LoRaWAN protocol such as a key NtwSEndKey and a key SNwkSIntKey, each of these keys being unique for each endpoint. The key NtwSEndKey is used for coding a useful part (payload) of the acknowledgement frame. The key SNwkSIntKey is used for coding the MIC (message integrity code) part of the acknowledgement frame.

In a step 419, the endpoint 160A receives the acknowledgment frame and checks that the value of the variable FcntDown_S is higher than the value of the variable FcntDown_T. If the value of the variable FcntDown_S is higher than the value of the variable FcntDown_T, the endpoint 160A accepts the acknowledgement frame and increments the value of the variable FcntDown_T by one unit.

It should be noted that, as in a conventional LoRa network, the acknowledgements of frames in the context of the invention are optional.

Until now, we have assumed that the meters 120A-E are strictly identical. Thus each meter 120A-E comprises an interface having a communication interface 114 and implements a LoRa gateway.

In one embodiment, all the meters 120A-E implement a LoRa gateway but do not necessarily comprise a communication interface 114. A meter 120A-E can therefore implement a LoRa gateway without being capable of receiving or transmitting LoRa frames. For example, in this embodiment, the meter 120A does not comprise a communication interface 114 but implements a LoRa gateway, which enables it to execute in particular steps 405, 409, 410, 411, 412 and 904.

In one embodiment, some meters do not comprise a communication interface 114 and do not implement a LoRa gateway. These meters can then be intermediate meters between two meters implementing a LoRa gateway. These meters then merely relay G3-PLC frames without having any regard to the content of these frames.

When the communication interface comprises a plurality of data concentrators 110, it is possible that the LNS server 150 may receive a plurality of HTTP frames encapsulating the same uplink LoRa frame from a plurality of different data concentrators 110. In this case, the subparts 62 of each HTTP frame received contain information representing different sets of meters that have received the same uplink LoRa frame. It is possible in fact to imagine that an uplink LoRa frame sent by the endpoint 160A is received by the meters 120B, 120C and 120D, but that the meters 120B and 120C are attached to a first data concentrator 110 whereas the meter 120D is attached to a second data concentrator 110. In this case, the processing module 30 of the LNS server 150 takes into account all the HTTP frames containing the same uplink LoRa frame. When the processing module 30 of the LNS server 150 must designate a meter for relaying frames to an endpoint or for acknowledging frames, it designates it from among the meters indicated in the subparts 62 of each HTTP frame received.

The invention claimed is:

1. A method for transporting frames sent by endpoints in the direction of a server over a low power wide area network (LPWAN) by means of a first automated meter management (AMM) powerline communication network of a system for an automated management of meterings from a plurality of electricity meters, referred to as meters, the meters being attached to at least one data concentrator via the AMM powerline communication network, each data concentrator being connected to the server via a second communication network and serving as a relay between the meters and the server, the method comprising:
receiving at least one frame in accordance with a communication protocol suited to LPWANs, each of the at least one frame received corresponding to a same frame sent over the LPWAN by an endpoint;
relaying a received frame, referred to as a first frame, corresponding to the frame sent by the endpoint, in the direction of the server, the first frame being selected in accordance with a first predetermined criterion; and
when a plurality of frames corresponding to the frame sent by the endpoint are received, rejecting at least a subset of frames in the plurality of frames, different from the first frame, each frame in the subset of frames being selected in accordance with a second predetermined criterion.

2. The method according to claim 1, wherein the first predetermined criterion includes selecting the frame corresponding to the frame sent by the endpoint that was received first or selecting the first frame randomly from among the frames corresponding to the frame sent by the endpoint received during a predetermined period, or selecting the first frame offering a best reception quality from among the frames corresponding to the frame sent by the endpoint that were received during a predetermined period.

3. The method according to claim 1, wherein the second predetermined criterion includes rejecting each frame in the plurality of frames that is different from the first frame or randomly selecting a predefined quantity of frames from among the frames in the plurality of frames that are different from the first frame, all the other frames in the plurality of frames being rejected, or selecting a predefined quantity of frames offering a best transmission quality from among the frames in the plurality of frames that are different from the first frame, all the other frames in the plurality of frames being rejected.

4. The method according to claim 1, wherein a meter in the plurality of electricity meters transmits an acknowledgement frame in the direction of the endpoint in order to acknowledge the frame sent by the endpoint when the meter has been designated by the server for acknowledging each frame sent by the endpoint.

5. A non-transitory computer-readable storage medium storing instructions therein that, when executed by a processor, cause the processor to perform the method according to claim 1.

6. An electricity meter included in an automated meter management (AMM) system that is used for automated management of meterings from a plurality of electricity meters, the plurality of electricity meters being attached to at least one data concentrator via a first powerline communication network, each data concentrator being connected to a server via a second communication network, and serving as a relay between the plurality of electricity meters and the server, the electricity meter comprising:

a processor adapted to:
relay, in the direction of the server, a received frame, referred to as a first frame, received by the electricity meter, corresponding to a frame in accordance with a communication protocol suited to low power wide area networks (LPWANs) sent by an endpoint over a low power wide area network (LPWAN), the first frame being selected in accordance with a first predetermined criterion; and
reject at least a subset of frames that are different from the first frame when a plurality of frames corresponding to the frame sent by the endpoint are received, each frame in the subset of frames being selected in accordance with a second predetermined criterion.

7. The electricity meter according to claim 6, further comprising a communication interface with the LPWAN enabling the electricity meter to receive frames in accordance with the communication protocol suited to the LPWANs.

8. A system for automated management of meterings, the system comprising the electricity meter according to claim 7.

9. A system according to claim 8, wherein, when the system comprises a plurality of LPWAN meters, the server is adapted for determining, for each endpoint communicating with one of the LPWAN meters, that the LPWAN meter communicates with each endpoint communicating with one of the LPWAN meters to acknowledge each frame sent by each endpoint communicating with one of the LPWAN meters.

10. A system for automated management of meterings, the system comprising the electricity meter according to claim 6.

* * * * *